United States Patent
Qi et al.

(10) Patent No.: US 7,373,724 B2
(45) Date of Patent: May 20, 2008

(54) LASER LEVEL WITH IMPROVED LEVELING ADJUSTABILITY

(75) Inventors: Yong-ce Qi, Hang-Zhou (CN); Hua-tang Liu, Taichung Hsien (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/353,892

(22) Filed: Feb. 14, 2006

(65) Prior Publication Data
US 2007/0044333 A1    Mar. 1, 2007

(30) Foreign Application Priority Data
Aug. 31, 2005   (TW) .............................. 94129961 A (51) Int. Cl.
*G01C 5/02*   (2006.01)
(52) U.S. Cl. ..................................................... 33/291
(58) Field of Classification Search .................. 33/291, 33/290, 295, 375, 1 M, 281, 282, 283, 285, 33/286, DIG. 21
See application file for complete search history.

(56) References Cited
U.S. PATENT DOCUMENTS

| | | | | |
|---|---|---|---|---|
| 3,471,234 A * | 10/1969 | Studebaker | ............ | 33/DIG. 21 |
| 3,588,249 A * | 6/1971 | Studebaker | ............ | 33/DIG. 21 |
| 4,265,027 A * | 5/1981 | Burniski | ........................ | 33/291 |
| 4,993,161 A * | 2/1991 | Borkovitz | .................... | 33/291 |
| 5,400,514 A * | 3/1995 | Imbrie et al. | .................. | 33/286 |
| 5,475,930 A * | 12/1995 | Kimura | ........................ | 33/290 |
| 5,724,744 A * | 3/1998 | Bozzo | .......................... | 33/291 |
| 5,852,493 A * | 12/1998 | Monnin | ........................ | 33/291 |
| 5,987,763 A * | 11/1999 | Ammann et al. | ............. | 33/290 |
| 6,195,901 B1* | 3/2001 | Falb | ............................. | 33/286 |
| RE37,318 E * | 8/2001 | Porter | .......................... | 33/290 |
| 6,906,310 B1* | 6/2005 | Jiang et al. | .................... | 33/290 |
| 2004/0172836 A1* | 9/2004 | Ng et al. | ....................... | 33/286 |
| 2005/0184205 A1 | 8/2005 | Fang | | |

* cited by examiner

*Primary Examiner*—G. Bradley Bennett (57) ABSTRACT

A laser level includes a level-adjusting device and a laser transmitter device mounted on the level-adjusting device. The level-adjusting device includes a horizontal flat board movable by a plurality of motor modules to a desired condition, a cross rotatable circle including an outer circle rotatable about a first rotation axis and a concentric inner circle rotatable about a second rotation axis perpendicular to the first rotation axis, and a connecting post connecting the horizontal flat board to the cross rotatable circle and supporting the laser transmitter thereon.

15 Claims, 7 Drawing Sheets

LASER LEVEL WITH IMPROVED LEVELING ADJUSTABILITY

BACKGROUND OF THE INVENTION

1. Field of the Invention

The present invention relates to a laser level, and more particularly to a laser level with improved leveling adjustability.

2. Description of the Prior Art

Because of excellent linearity, a laser level is commonly used to measure or verify the horizontality or perpendicularity of an object by emitting and receiving a laser beam. As the cost of laser transmitter decreases ceaselessly, the laser level is getting more and more common in architecture/construction projects or installation of large machines.

A conventional laser level generally comprises a level-adjusting device and a laser transmitter mounted on the level-adjusting device. The level-adjusting device adjusts the leveling of the laser transmitter whereby the laser transmitter can project a laser beam in a correct direction.

The level-adjusting device can do direction adjustment in either an active manner or a passive manner. In passive adjustment, leveling adjustment is done by means of gravitation or buoyancy of liquid, while in active adjustment, adjustment of leveling is performed through mechanical driving.

Figure 1:
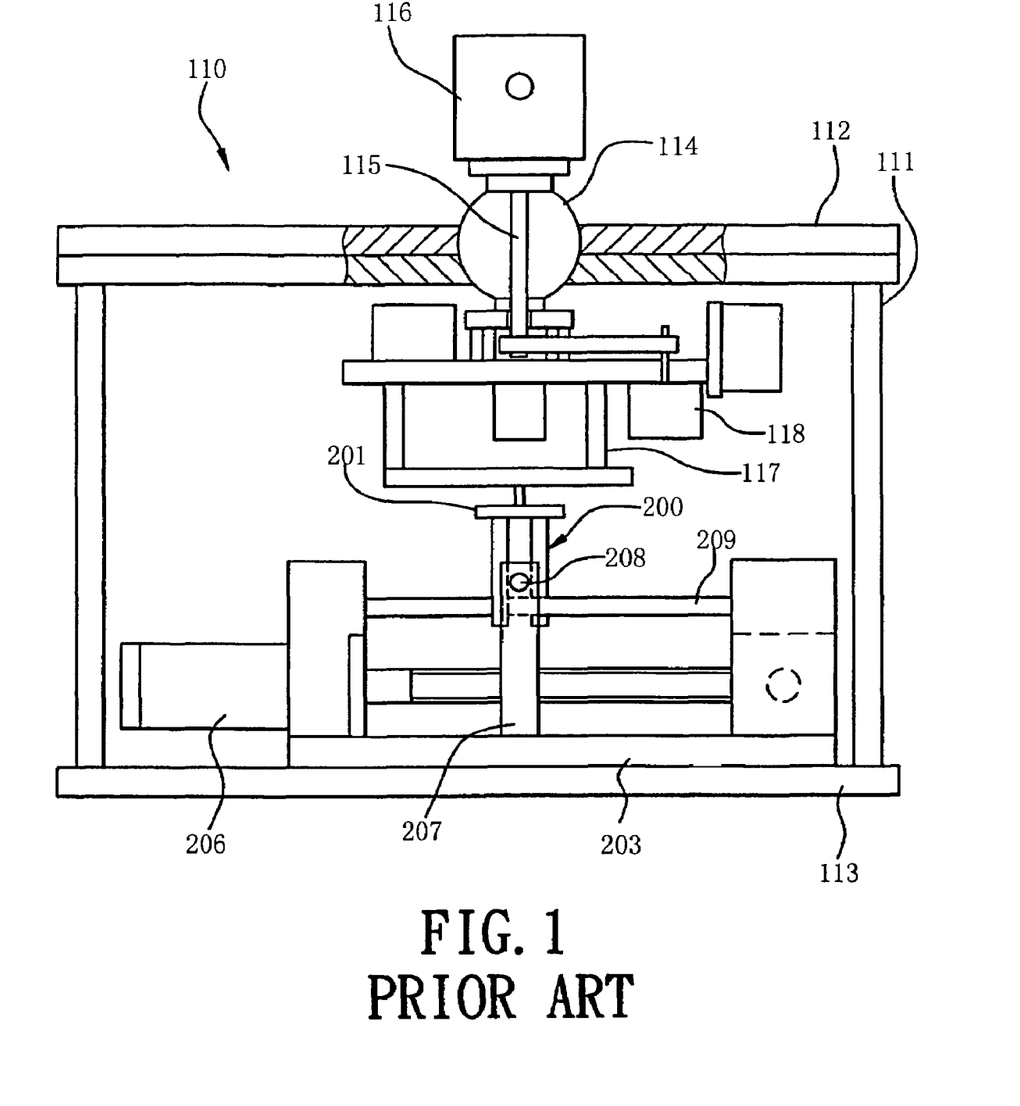
FIG. 1 is a cutaway view of a conventional level-adjusting device with an object mounted thereon.
Figure 2:
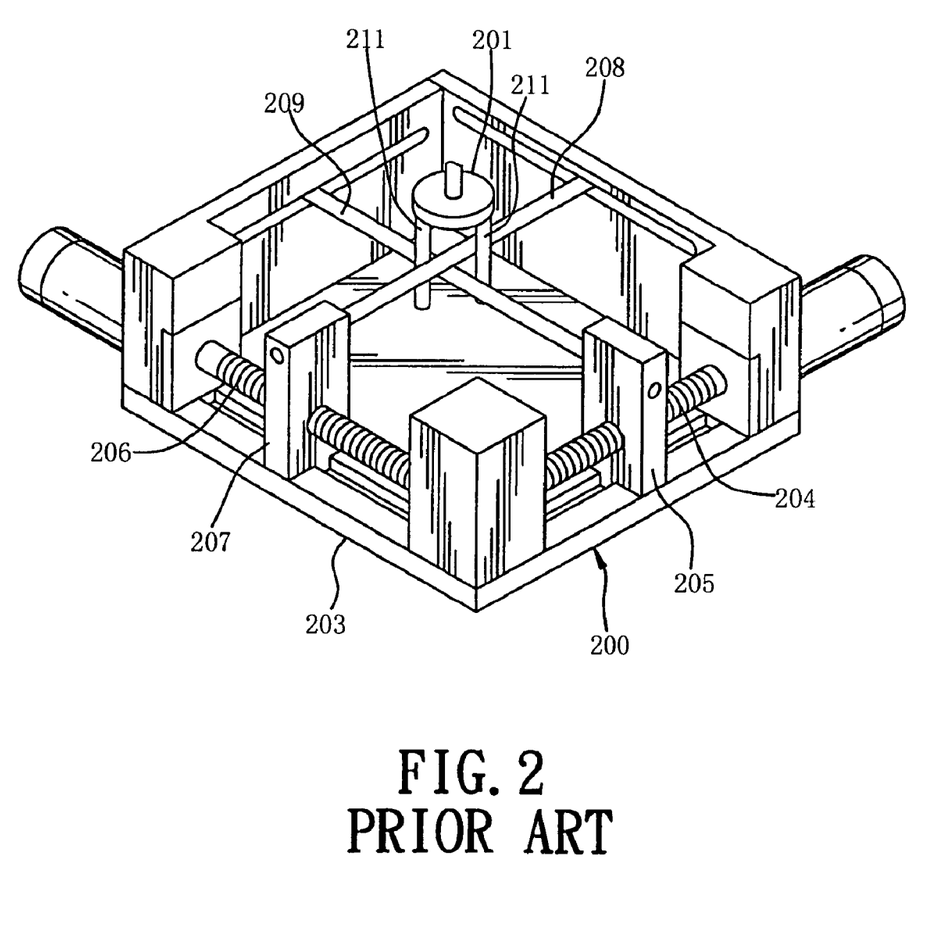
FIG. 2 is a perspective view of a transmission unit of the level-adjusting device of FIG. 1.
Figure 3:
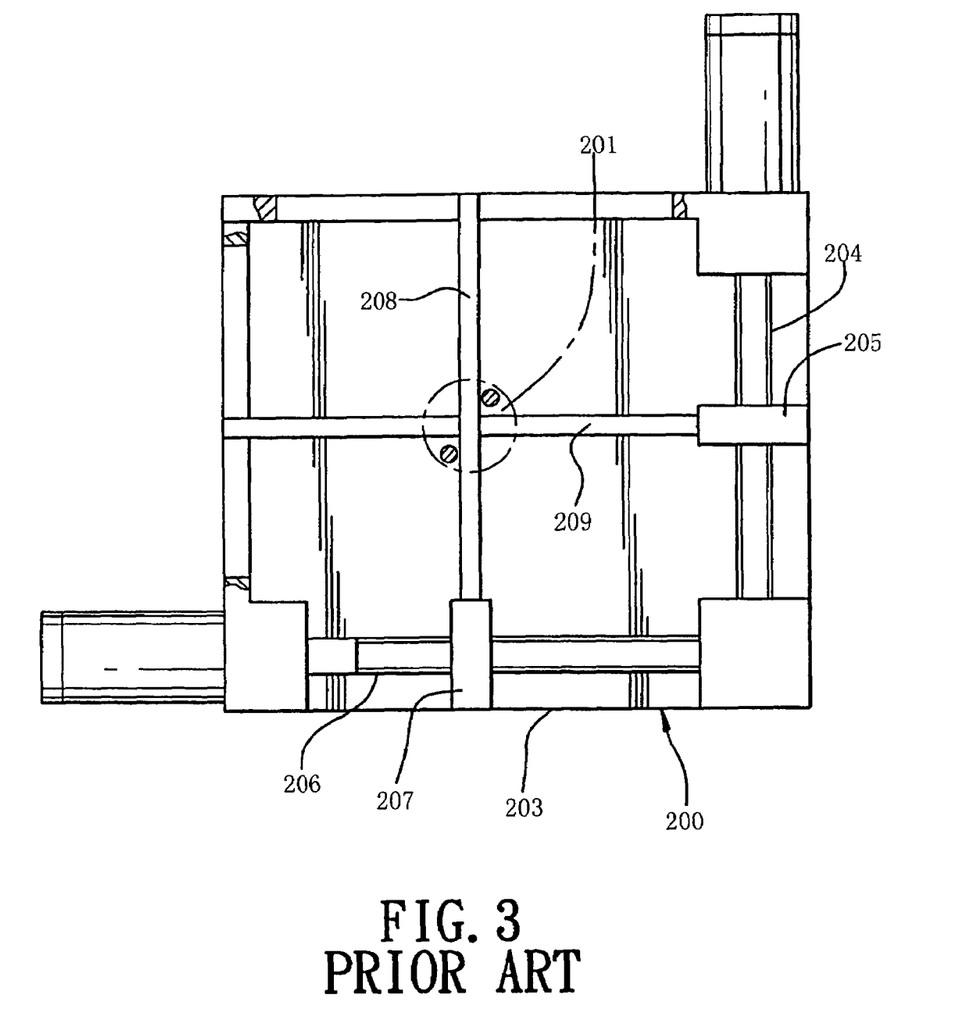
FIG. 3 is a cutaway top view of the transmission unit of the level-adjusting device of FIG. 1.

FIGS. 1-3 of the attached drawings illustrate a conventional level-adjusting device 110 for adjusting leveling of an object 116, such as a laser transmitter, mounted thereon. The level-adjusting device 110 comprises a base 113, a plurality of posts 111 extending upright from the base 113, a mounting plate 112 supported by the posts 111, a rotatable spherical body 114 mounted in an opening defined in the mounting plate 112, and a shaft 115 extending through the spherical body 114, connected to the object 116, and driven by a motor 118 so as to permit rotation of the object 116 upon actuation of the motor 118. The shaft 115, together with the object 116, is slightly moved relative to a horizontal plane, i.e. the sea level, upon rotation of the spherical body 114 during level adjustment of the object 116.

The spherical body 114 is rotated by a transmission unit 200 that comprises a mounting seat 117 connected to the spherical body 114, a connecting member 201 connected to the mounting seat 117 and having two opposite legs 211, a first operating rod 208 engageable with one of the legs 211 for driving the connecting member 201 to move in a first horizontal direction and engageable with the other of the legs 211 for driving the connecting member 201 to move in a first opposite direction opposite to the first horizontal direction, and a second operating rod 209 engageable with one of the legs 211 for driving the connecting member 201 to move in a second horizontal direction and engageable with the other of the legs 211 for driving the connecting member 201 to move in a second opposite direction opposite to the second horizontal direction.

The first and second operating rods 208, 209 are mounted slidably on a support 203 through first and second threaded blocks 207, 205 and first and second screw rods 206, 204, which engage, threadedly and respectively, the first and second threaded blocks 207, 205. In operation, movement of the first or second operating rod 208, 209 or both the first and second operating rods 208, 209 results in rotation of the spherical body 114, which, in turn, results in co-movement of the object 116 and the shaft 115 to the sea level.

The aforesaid conventional level-adjusting device 110 is disadvantageous in that leveling adjustment of the object 116 is time-consuming. For instance, since the spherical body 114 can only rotate about its center, movement of the first operating rod 208 not only results in movement of the connecting member 201 in the first horizontal direction, but also results in an undesired movement of the transmission member 201 in the second horizontal direction due to rotation of the spherical body 114, which requires further operation of the second operating rod 209 to adjust leveling of the object 116, which, in turn, requires further operation of the first operating rod 208, and so on. As a consequence, the operation is quite time-consuming.

Hence, an adjusting device is required to overcome the above-mentioned disadvantages of the prior art.

SUMMARY OF THE INVENTION

Therefore, an object of the present invention is to provide a laser level with improved leveling adjustability in order to overcome the aforesaid drawbacks associated with the prior art.

According to the present invention, there is provided a laser level comprising a level-adjusting device and a laser transmitter device mounted on the level-adjusting device. The level-adjusting device comprises a plurality of motor modules, each selectively driving a block in a vertical direction, and a horizontal flat board supported by the blocks to be set to a desired condition by the movements of the blocks. A cross rotatable circle is arranged above the horizontal flat board, and comprises an outer circle rotatable about a first rotation axis and a concentric inner circle rotatable about a second rotation axis substantially perpendicular to the first rotation axis. Thus, the inner circle is rotatable in two directions with respect to the level-adjusting device. A connecting post couples the cross rotatable circle to the horizontal flat board. The connecting post has an end fixed to the horizontal flat board and an opposite end closely fit in the inner circle and carrying an adjusting flat board that is turn supports the laser transmitter thereon. The rotation of the inner circle in the two directions is independent of each other, whereby adjusting the horizontal flat board by the motor modules results in independent adjustment of the adjusting flat board and thus the laser transmitter in the two directions. A time efficient adjustment can be realized.

The advantages and novel features of the invention will become more apparent from the following detailed description of a preferred embodiment when taken in conjunction with the accompanying drawings.

BRIEF DESCRIPTION OF THE DRAWINGS

The present invention may best be understood through the following description with reference to the accompanying drawings, in which.

DETAILED DESCRIPTION OF THE PREFERRED EMBODIMENT

Reference will now be made in detail to a preferred embodiment of the present invention.

Figure 4:
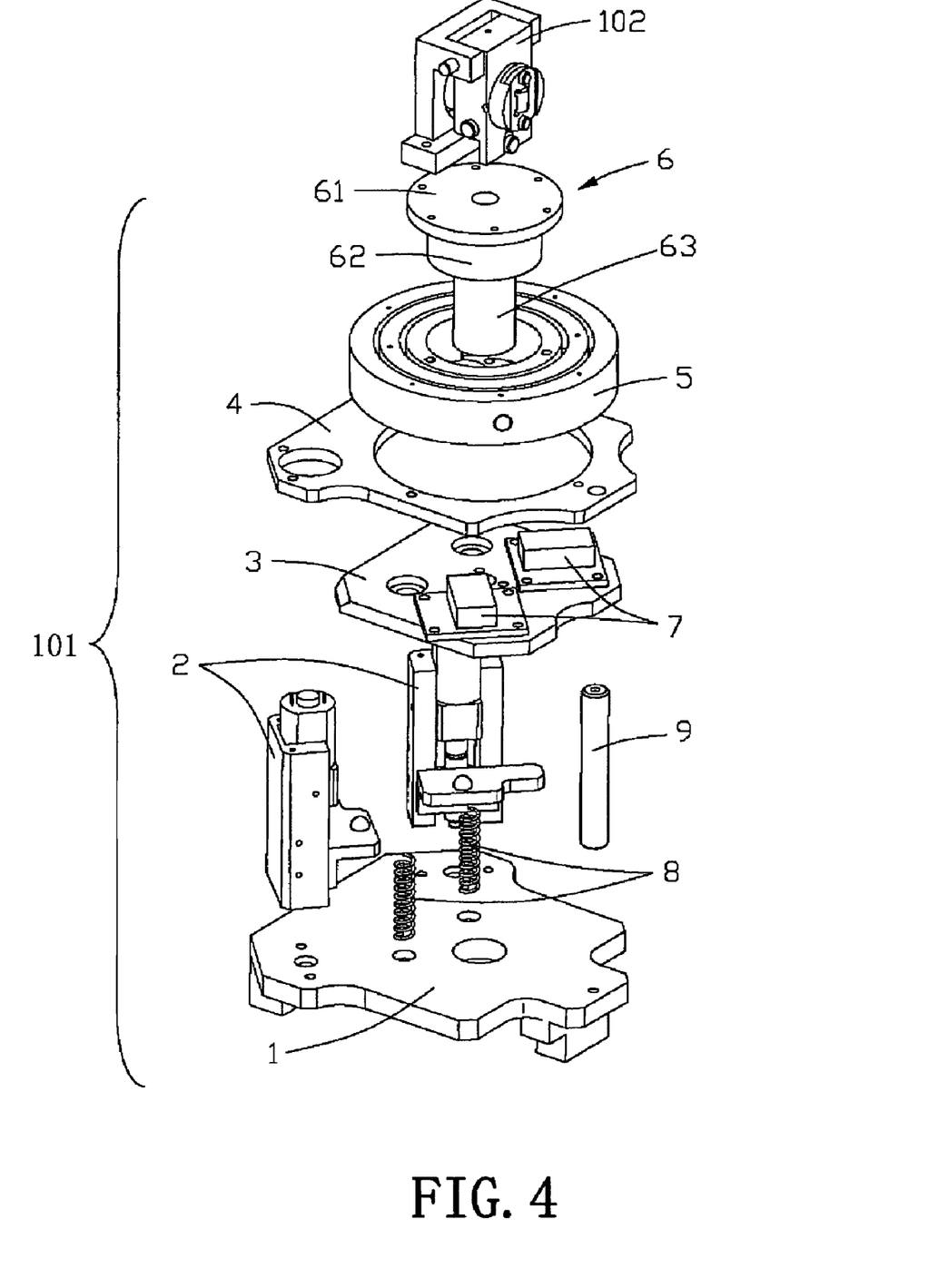
FIG. 4 is an exploded perspective view showing of a laser level in accordance with a preferred embodiment of the present invention.
Figure 5:
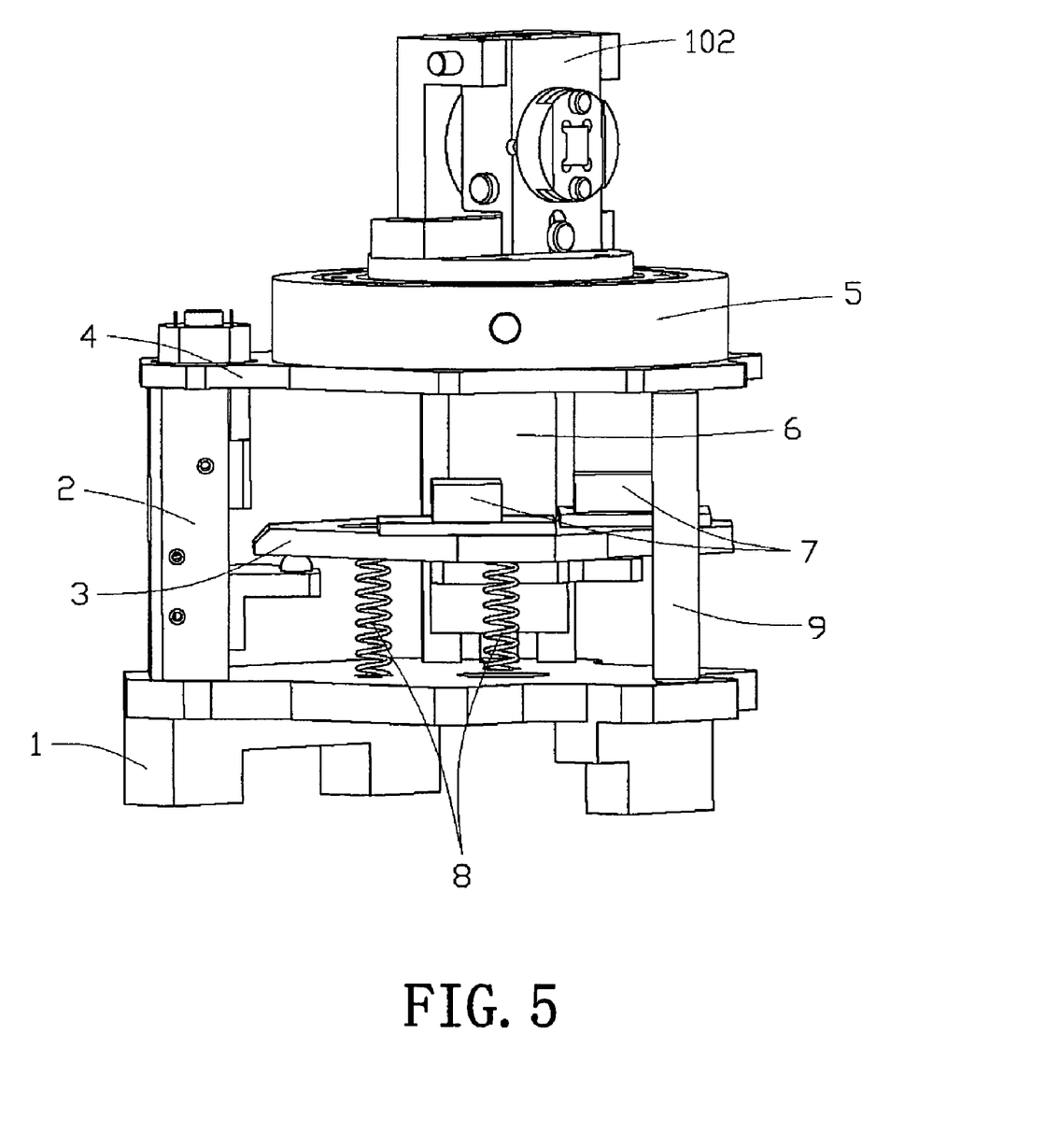
FIG. 5 is a perspective view of the laser level in accordance with the present invention.

Referring to FIGS. 4 and 5, a laser level constructed in accordance with the present invention comprises a level-adjusting device 101 and a laser transmitter device 102 mounted on the level-adjusting device 101.

The level-adjusting device 101 comprises a support base 1, two motor modules 2, two spring 8, a support post 9, a horizontal flat board 3, two level detecting sensors 7, a plank 4, a cross rotatable circle 5, and a connecting post 6.

The connect post 6 comprises a cylinder 62, a circular flat board 61 perpendicularly mounted to one end of the cylinder 62, and an extension post 63 coaxially extending from an opposite end of the cylinder 62.

Figure 6:
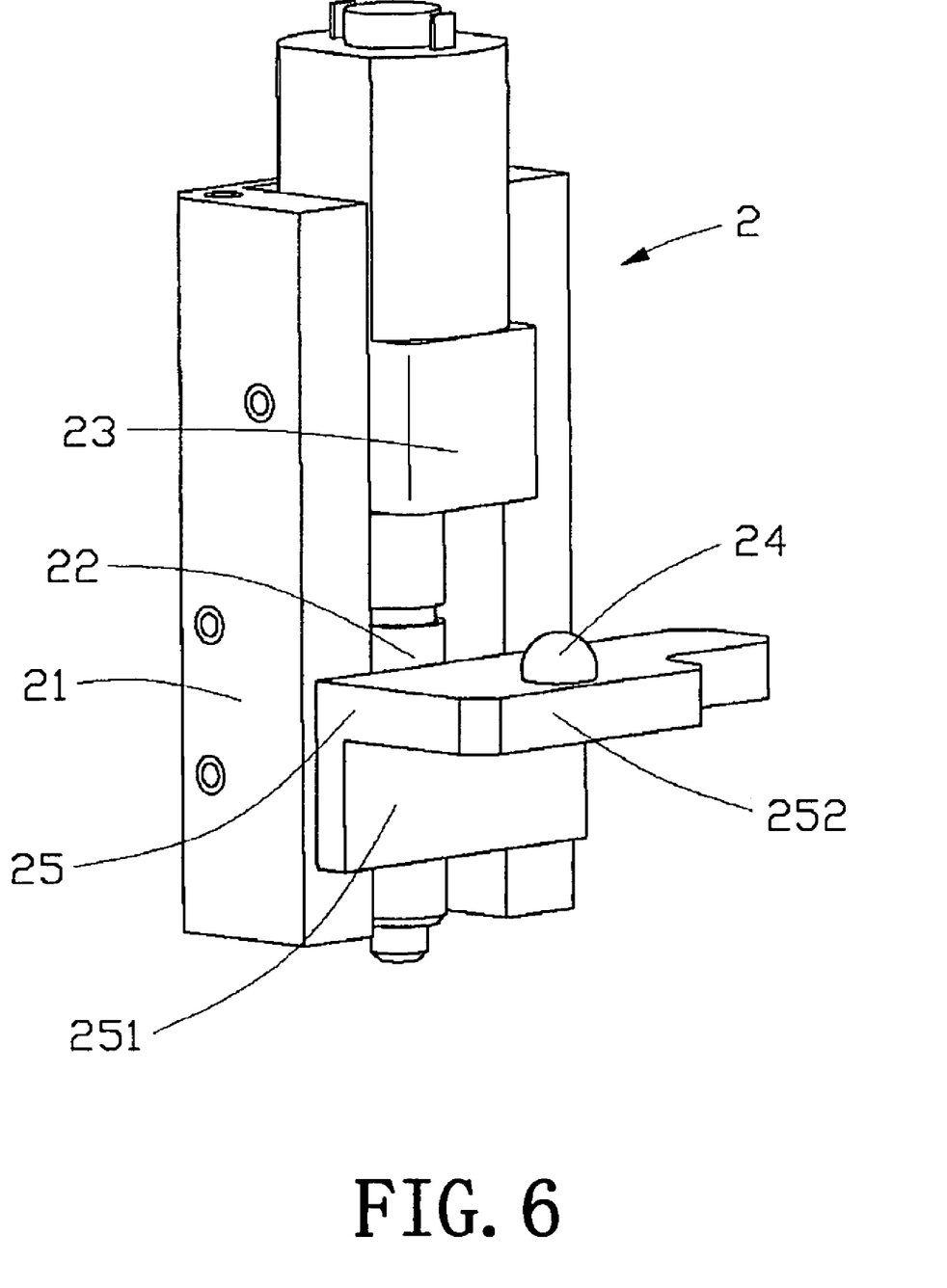
FIG. 6 is a perspective view of a motor module of the laser level of the present invention.

Also referring to FIG. 6, each motor module 2 comprises an upright post 21 in an inside face of which a trough (not labeled) co-extensive therewith is defined. A screw rod 22 is arranged inside the trough and extends in parallel to the post 21. A motor 23 is coupled to an end of the screw rod 22 for selectively rotating the screw rod 22. An L-shaped block 25 is movably coupled to the post 21. The block 25 comprises a mounting portion 251 that is in driving engagement with the screw rod 22 and a support portion 252 extending from the mounting portion 251. A spherical member, such as a steel ball 24, is rotatably mounted on an upper surface of the support portion 252. The rotation of the screw rod 22 caused by the motor 23 selectively moves the block 25 up and down along the screw rod 22.

Figure 7:
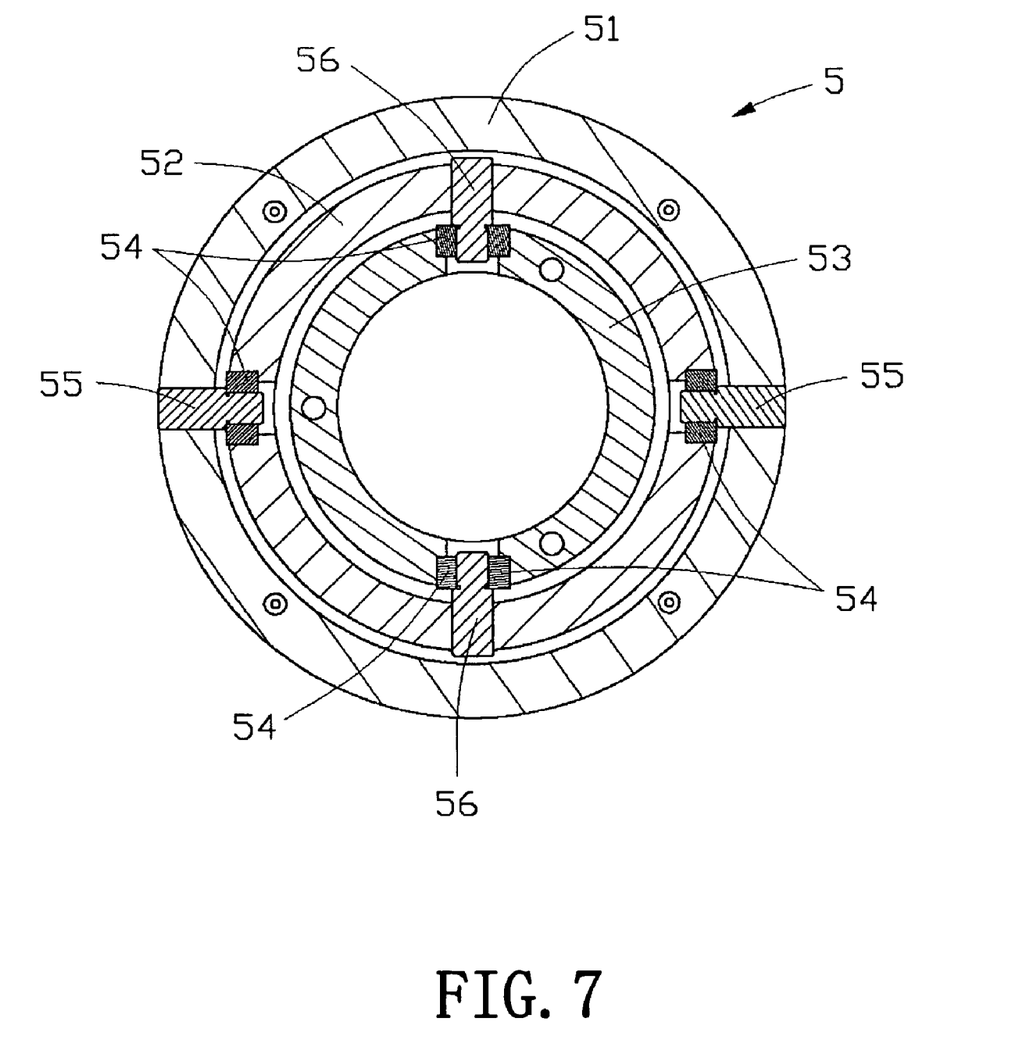
FIG. 7 is a perspective view of a cross rotatable circle of the laser level of the present invention.

Referring to FIG. 7, the cross rotatable circle 5 comprises an annular outer cover 51, an outer circle 52, and an inner circle 53 concentric with each other. Extending along a first direction from an inner surface of the outer cover 51 is a pair of diametrically aligned rotary pivots 55, which will be referred to as "first pivots" hereinafter. The outer circle 52 is rotatably mounted in the outer cover 51 through two bearings 54 that receivingly engage the first pivots 55 to allow the outer circle 52 to rotate about the first pivots 55 inside the outer cover 51. Extending in a second direction from an inner surface of the outer circle 52 is a pair of diametrically aligned rotary pivots 56, which will be referred to as "second pivots" hereinafter. The inner circle 53 is rotatably mounted in the outer circle 52 through two bearings 54 receivingly engaging the second pivots 56 to allow the inner circle 53 to rotate about the second pivots 56 inside the outer circle 52. Thus, the inner circle 53 is rotatable with respect to the outer circle 52 about an axis extending in the second direction defined by the second pivots 56, and the outer circle 52 is rotatable with respect to the outer cover 51 about an axis extending in the first direction defined by the first pivots 55. The rotations of the inner circle 53 and the outer circle 52 are independent of each other, whereby the inner circle 53 is rotatable with respect to the outer cover 51 at any desired angular position along both the first and second axes. Preferably, the first axis and the second axis are perpendicular to each other.

Referring to FIG. 5, the two motor modules 2 are mounted on the support base 1 with the upright posts 21 substantially perpendicular to the base 1. The motor modules 2 are arranged in such a way that the extending directions of the support portions 252 of the blocks 25 are substantially normal to each other. In other words, the motor modules 2 are angularly spaced by about 90 degrees with the troughs thereof facing diametrically inwards. The horizontal flat board 3 is positioned on the support portions 252 of the blocks 25 by contacting the steel balls 24.

The level detecting sensors 7 are placed on an upper surface of the horizontal flat board 3 opposite to the two motor modules 2 respectively. The springs 8 are positioned between a bottom surface of the horizontal flat board 3 and the support base 1. The support post 9 is arranged on the support base 1 at a position that forms a triangle with the two motor modules 2. That means the support post 9 and the motor modules 2 are apexes of the triangle. The support post 9 and the two motor modules 2 support the plank 4 together. The cross rotatable circle 5 is mounted on the plank 4.

The cylinder 62 of the connecting post 6 has an outside diameter substantially corresponding to an inner diameter of the inner circle 53 and is fit into the inner circle 53 with the flat board 63 resting on the cross rotatable circle 5 and a free end of the extension post 63 mounted to the horizontal flat board 3.

In operation, the sensors 7 detect the level of the horizontal flat board 3 in the first and second directions. Based on the result of detection by the sensors 7, the motor 2 drives the blocks 25 to move up and down to adjust the horizontal flat board 3 until the horizontal flat board 3 becomes horizontal. Because of the spring forces induced by the springs 8, the horizontal flat board 3 is maintained constantly in contact with the steel balls 24 on the blocks 25 and moves up and down in unison with the blocks 25. The springs 8 also ensure that the blocks 25 are in mating engagement with the screw rods 22.

During the adjustment of the horizontal flat board 3, the connecting post 6 swings with the movement of the flat board 3. Because the cylinder 62 is closely fit in the inner circle 53 of the cross rotatable circle 5, the inner circle 53 and outer circle 52 move with the cylinder 62 until the flat board 61 becomes horizontal. Since the inner circle 53 can only rotate about the second pivots 56 and the outer circle 52 can only rotate about the first pivots 55, the level adjusting is independently in the first and second directions, which can be at any angle with respect to each other and preferably perpendicular to each other. This arrangement helps reducing mutual interference between the two directions and saves adjusting time.

As the level-adjusting device 101 is adjusted to the horizontal, the laser transmitter device 102 mounted on the level-adjusting device 101 can work horizontally.

It is to be understood, however, that even though numerous characteristics and advantages of the present invention have been set forth in the foregoing description, together with details of the structure and function of the invention, the disclosure is illustrative only, and changes may be made in detail within the principles of the invention to the full extent indicated by the broad general meaning of the terms in which the appended claims are expressed.

What is claimed is:

1. A laser level comprising a level-adjusting device and a laser transmitter device mounted on the level-adjusting device; the level-adjusting device comprising:

a plurality of motor modules angularly spaced from each other, each motor module selectively driving a movable block in a vertical direction;

a horizontal flat board supported by the blocks and movable by the blocks to a desired condition;

a cross rotatable circle comprising an outer circle rotatable about a first rotation axis and a concentric inner circle rotatable about a second rotation axis perpendicular to the first rotation axis; and a connecting post connecting the horizontal flat board to the cross rotatable circle, comprising an end mounted on the horizontal flat board and an opposite end coupled with the inner circle and an adjusting flat board perpendicularly fixed to the post for supporting the laser transmitter.

2. The laser level as claimed in claim 1, wherein the level-adjusting device comprises two motor modules.

3. The laser level as claimed in claim 2, wherein the motor modules are angularly spaced from each other by an angle of 90 degrees.

4. The laser level as claimed in claim 1, wherein each motor module comprises a vertical post defining a trough to receive and retain a screw rod, and a motor drivingly coupled to the screw rod for rotating the screw rod, the block being in driving engagement with the screw rod whereby the rotation of the screw rod causes the block to move along the post.

5. The laser level as claimed in claim 4, wherein the block comprises a first portion in driving engagement with the screw rod and a second portion supporting the horizontal flat board.

6. The laser level as claimed in claim 5 further comprising a spherical member mounted on the second portion of the block to engage and support the horizontal flat board.

7. The laser level as claimed in claim 1 further comprising a level detection sensor mounted on the horizontal flat board and substantially in diametrical alignment with each motor module.

8. The laser level as claimed in claim 1, wherein the level-adjusting device comprises a support base on which the motor modules are mounted.

9. The laser level as claimed in claim 8 further comprising biasing means arranged between the horizontal flat board and the support base.

10. The laser level as claimed in claim 1, wherein the level-adjusting device comprises a plank supported by the motor modules, the cross rotatable circle being mounted on the plank.

11. The laser level as claimed in claim 10, wherein the level-adjusting device comprises a support post connecting between the plank and the support base.

12. The laser level as claimed in claim 1, wherein the cross rotatable circle comprises annular outer cover having an inner wall from which first diametrically-aligned pivots extend to define the first rotation axis, the outer circle being received in the outer cover by being rotatably supported by the first pivots.

13. The laser level as claimed in claim 1, wherein the outer circle has an inner wall from which two diametrically aligned pivots extend to define the second rotation axis, the inner circle being received in the outer circle by being rotatably supported by the pivots.

14. The laser level as claimed in claim 1, wherein the opposite end of the connecting post is closely fit in the inner circle of the cross rotatable circle.

15. The laser level as claimed in claim 2 further comprising a plank carrying the cross rotatable circle, a support base from which the motor modules extend, and a support post extending from the support base, the plank being supported by the motor modules, the support post and the motor modules being arranged in apexes of a triangle.

* * * * *